United States Patent [19]

Tomita et al.

[11] 4,225,297
[45] Sep. 30, 1980

[54] NOZZLE PRE-HEATING DEVICE IN A PRILLING APPARATUS

[75] Inventors: Shoji Tomita; Tetsuya Tokunaga, both of Fujieda, Japan

[73] Assignee: Sumitomo Durez Company, Ltd., Tokyo, Japan

[21] Appl. No.: 960,693

[22] Filed: Nov. 14, 1978

[30] Foreign Application Priority Data

Nov. 25, 1977 [JP] Japan .................. 52-140664

[51] Int. Cl.³ .............................................. B22D 11/01
[52] U.S. Cl. ............................................ 425/6; 264/13
[58] Field of Search ............................... 425/6; 264/13

[56] References Cited

U.S. PATENT DOCUMENTS

| 2,510,574 | 6/1950 | Greenhalgh | 425/6 |
| 2,898,625 | 8/1959 | Chao | 425/6 |
| 3,642,393 | 2/1972 | Ross et al. | 425/6 |
| 3,677,669 | 7/1972 | Bliemeister | 425/6 |

Primary Examiner—Donald J. Arnold
Assistant Examiner—James R. Hall
Attorney, Agent, or Firm—Peter F. Casella; James F. Mudd

[57] ABSTRACT

A nozzle pre-heating device is provided for use in a tower for prilling molten substances. The device comprises a pre-heating chamber which is open only at the upper portion thereof for pre-heating a prilling nozzle and is closed at the bottom to shield the nozzle from the cooling effects of upper flowing gas in the prilling tower. The device is provided with means for moving either the nozzle or the pre-heating device from proximity to one another when the pre-heating device is not in use, thereby permitting free flow of the molten substance from the nozzle during normal operation of the prilling tower.

12 Claims, 2 Drawing Figures

NOZZLE PRE-HEATING DEVICE IN A PRILLING APPARATUS

BACKGROUND OF THE INVENTION

The present invention relates to a pre-heating device for a nozzle for use in a melt prilling apparatus.

Various prilling processes have been proposed for making prills from various substances in order to prevent dust formation and improve flowability thereof. Among these, the most important process is the melt prilling process in which a melted substance is showered or sprayed from the top of a tower with a perforated nozzle or with a rotary disc for making particles by centrifugal force, and prills are obtained either by drying or solidifying the dropping liquid particles with countercurrent gas introduced from the bottom of tower, or by dropping said liquid particles into a medium which is inert to said melted substance.

In such a prilling process, smooth passage of the melted substance through the nozzle is most important. In this connection pre-heating of the nozzle is indispensable, particularly important so as to prevent viscosity increase of the melted substance in the vicinity of the nozzle at the start of the prilling process.

In the absence of pre-heating, or in case of insufficient pre-heating, the melted substance present in the vicinity of the nozzle cools to show a viscosity increase or eventually solidifies and clogs the nozzle thereby rendering the operation impossible. In such case, the substance, once having solidified in the nozzle, is not easily melted even by forced heating, and the nozzle has to be removed for cleaning or replaced by a new nozzle followed by resumed pre-heating before the prilling operation can be started. Also, even if the nozzle is not clogged completely, partial clogging of the nozzle will result in formation of relatively large dripping liquid particles which drop in an unsolidified state and stick to the bottom of tower. The presence of such sticking unsolidified substance will cause reheating, by the heat accumulated therein, of other particles completely solidified in the fall, thereby resoftening such particles and thus forming a deposit on the bottom of the tower, rendering discharge of the prills difficult. It therefore becomes necessary to interrupt the operation and remove the deposit formed on the bottom of the tower. Such deposit, being a defective product, not only reduces the yield or production but also hinders continuous operation.

In general the nozzle is mounted at the lower portion of the spray chamber which is provided with a jacket for heating with steam or a heating medium to heat and maintain the temperature of said chamber, but such heating is hardly capable of heating the nozzle. However, as explained in the foregoing description a complete nozzle pre-heating is indispensable.

For such nozzle pre-heating there are already known methods, such as disclosed in the Japanese Patent Publication Sho-37-5002, of externally pre-heating a nozzle fixed in the center of the tower with a lamp or a resistor type heater, or a method of preheating the nozzle externally within the tower by blowing heated air. However these pre-heating methods, all depending on external heating and mostly utilize radiant heating and thus of low heating efficiency which is further reduced by air flow from the bottom of the tower, were unsatisfactory for sufficient heating even after a prolonged pre-heating time.

SUMMARY OF THE INVENTION

The present inventors have discovered that the unexpected cooling effect of the countercurrent gas from the bottom of the tower is significantly large when pre-heating the nozzle, and have thus arrived at the present invention wherein the pre-heating of the nozzle is achieved in a pre-heating chamber which is closed at the bottom and sides thereof and is only open at the upper portion thereof to shutout from the cooling gas current in the tower, and then either the nozzle or the pre-heating chamber is transferred by a mechanism to its position in initiating prilling.

The object of the present invention is to provide a device for favorably conducting pre-heating of the nozzle of the abovementioned process.

DESCRIPTION OF THE EMBODIMENT

In the following there will be given an explanation of the pre-heating device with a two-step positioning provided by the present invention, while making reference to the accompanying drawings.

Figure 1:
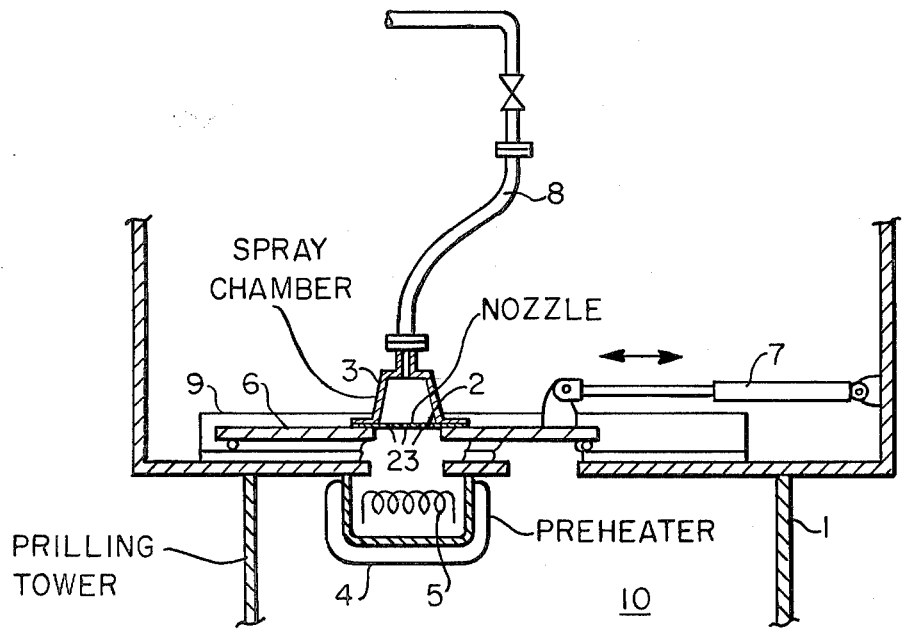

FIG. 1 is a cross-sectional view of the device of the present invention wherein the nozzle is movable, the drawing illustrating the state of pre-heating the nozzle. The nozzle is positioned above the pre-heating chamber, while the center opening at the tower top which is used for the prilling operation is covered in this state by the nozzle mounting plate. In this case the preheating chamber is fixed to the tower, and the pre-heated nozzle is shifted with the nozzle mounting plate to the center of the tower to initiate the prilling process.

Figure 2:
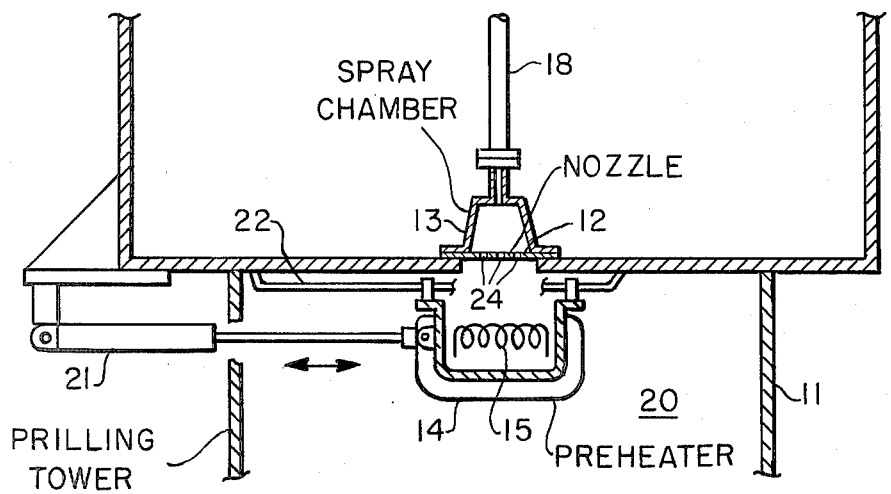

FIG. 2 is a cross-sectional view wherein the pre-heating chamber is movable, the drawing illustrating the state in which the nozzle is being pre-heated. In this case the nozzle is positioned in the center of the tower, and the pre-heating chamber, upon completion of nozzle pre-heating, is removed from the center of the tower to initiate the prilling operation.

In FIG. 1 there are shown: prilling tower 1, nozzle 2 provided with a plurality of orifices 23 spray chamber 3, pre-heating chamber 4 only open at the upper portion thereof and preferably heat-insulated to prevent heat dissipation, heat source 5 provided in the pre-heating chamber for nozzle pre-heating, sliding nozzle mounting plate 6, air cylinder 7 for shifting said nozzle mounting plate, flexible tube 8 connecting the feed pipe and the spray chamber, guide rail 9 for shifting the position of said nozzle mounting plate and prill cooling zone 10.

In FIG. 2 there are shown: prilling tower 11, nozzle 12 provided with a plurality of orifices 24, spray chamber 13, pre-heating chamber 14 only open at the upper portion thereof and preferably heat-insulated to prevent heat dissipation, heat source 15 provided in the pre-heating chamber for nozzle pre-heating, melt feed pipe 18, prill cooling zone 20, air cylinder 21 for shifting the position of the pre-heating chamber, and guide rail 22 for supporting and shifting the position of the pre-heating chamber.

The melted substance referred to in the present invention includes concentrated solutions and melted slurries which are solidified at the ambient temperature or a lower temperature but are liquified at a higher temperature. Examples of such melted substance are wax, paraffin, polyolefins, fatty acids, organic acids, rosins, naphthalene, higher alcohols, phthalic anhydride, bisphenol- A, sulfur, urea, phenolic resins, epoxy resins, alkyd resins, petroleum resins, coumarone-indene resins and pitch.

The nozzle referred to in the present invention includes either an ordinary pressurized nozzle, a twp-fluid nozzle, a plate nozzle provided with perforations for obtaining spray by gravity or by additional pressure, or a rotating disc nozzle.

The heating to be employed in the present invention can be achieved by either infrared lamp radiation, resistor type heater, induction heating, hot air blowing or any other suitable heating methods.

The nozzle pre-heating device of the present invention is effective in that pre-heating efficiency is improved to allow easy and complete pre-heating without unnecessary cooling of the nozzle by the gas flow from the bottom of the tower since the gas flow in the tower is shut off from the pre-heating chamber. The device also allows simple maintenance. The device of the present invention also avoids formation of material deposit at the bottom of the prilling tower which tends to appear particularly at the start of prilling operation, thus increasing the yield and facilitating control at the start of prilling operation.

The present invention can be used in connection with the invention disclosed in application entitled "Prilling Process and Apparatus Therefor," Ser. No. 960,549, filed on even date herewith the disclosure of which is incorporated herein by reference.

We claim:

1. A nozzle pre-heating device for use in a prilling apparatus comprising a pre-heating chamber adapted to be open only at the upper portion thereof for pre-heating a nozzle and to shield said nozzle from the cooling effects of upwardly flowing gas, and means for moving said nozzle from the proximity of said pre-heating device when the pre-heating device is not in use.

2. A nozzle pre-heating device for use in a prilling apparatus comprising a pre-heating chamber adapted to be open only at the upper portion thereof for pre-heating a nozzle and to shield said nozzle from the cooling effects of upwardly flowing gas, and means for moving said pre-heating device from the proximity of said nozzle when the pre-heating device is not in use.

3. A device according to claim 1 wherein said means for moving said nozzle is adapted to move in two stages, whereby said nozzle is positioned above said pre-heating chamber in the first stage and at the center of a prilling apparatus in the second stage.

4. A device according to claim 3 wherein the nozzle is supported on a nozzle mounting plate which is moveable along a guide rail by means of an air cylinder.

5. A device according to claim 2 wherein said means for moving said pre-heating device is adapted to move in two stages, whereby said pre-heating device is positioned beneath said nozzle in the first stage and away from said nozzle in the second stage.

6. A device according to claim 5 wherein the pre-heating chamber is supported on a guide rail and moveable by means of an air cylinder.

7. A device according to claim 1 wherein said pre-heating chamber is provided with an infrared lamp.

8. A device according to claim 1 wherein said pre-heating chamber is provided with a resistor-type heater.

9. A device according to claim 1 wherein said pre-heating chamber is provided with an induction heater.

10. A device according to claim 2 wherein said pre-heating chamber is provided with an infrared lamp.

11. A device according to claim 2 wherein said pre-heating chamber is provided with a resistor-type heater.

12. A device according to claim 2 wherein said pre-heating chamber is provided with an induction heater.

* * * * *